Dec. 1, 1959 F. CHAPLINSKI 2,915,217
ARTICLE FEEDING EQUIPMENT
Filed June 4, 1957 4 Sheets-Sheet 1
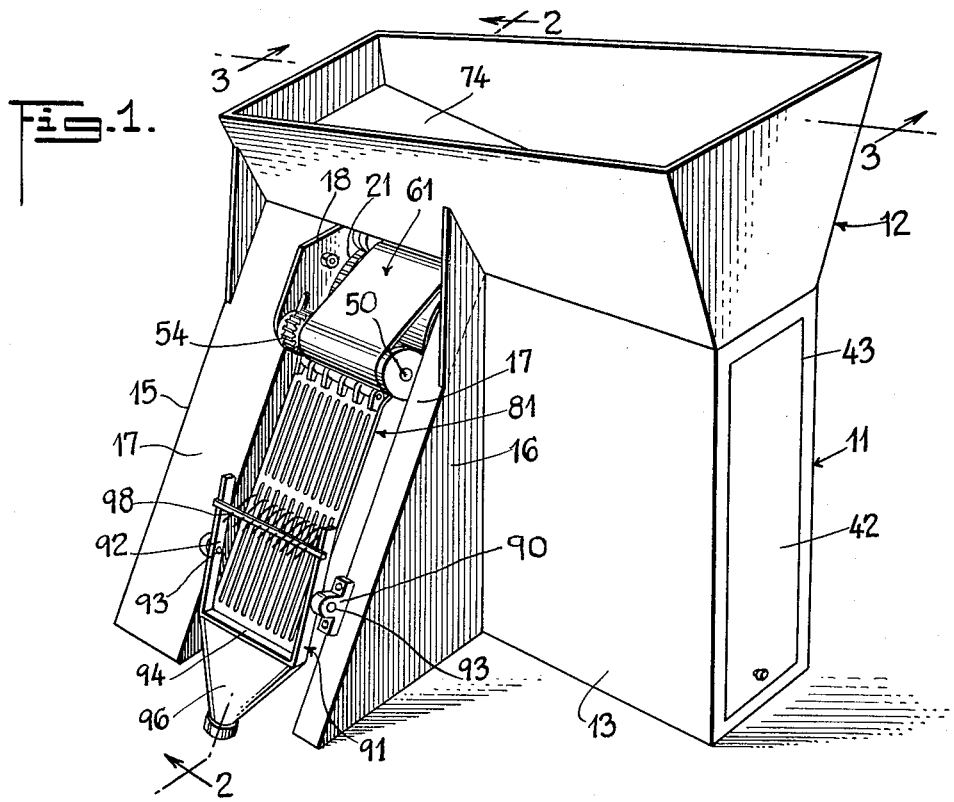
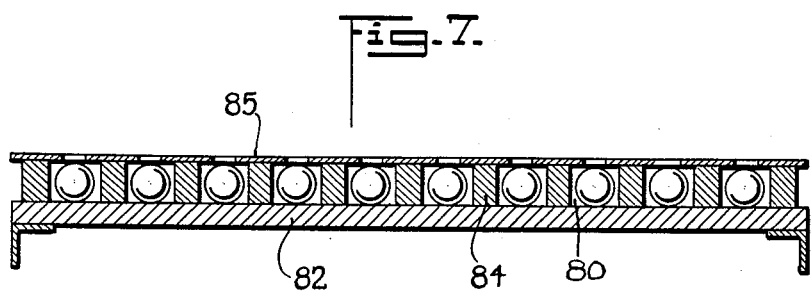
INVENTOR
FRANK CHAPLINSKI.
BY
Dean Fairbank & Hirsch
ATTORNEYS.

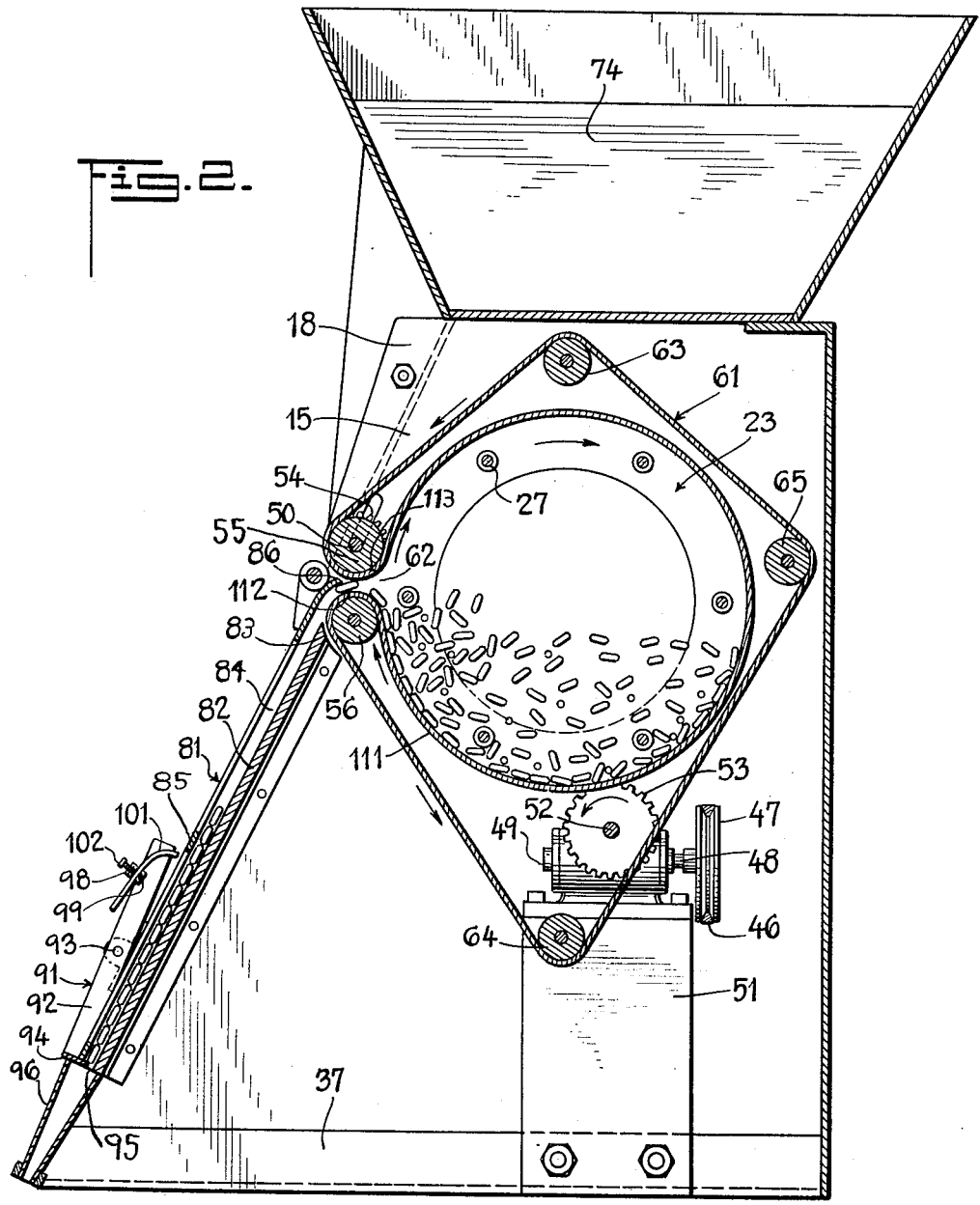

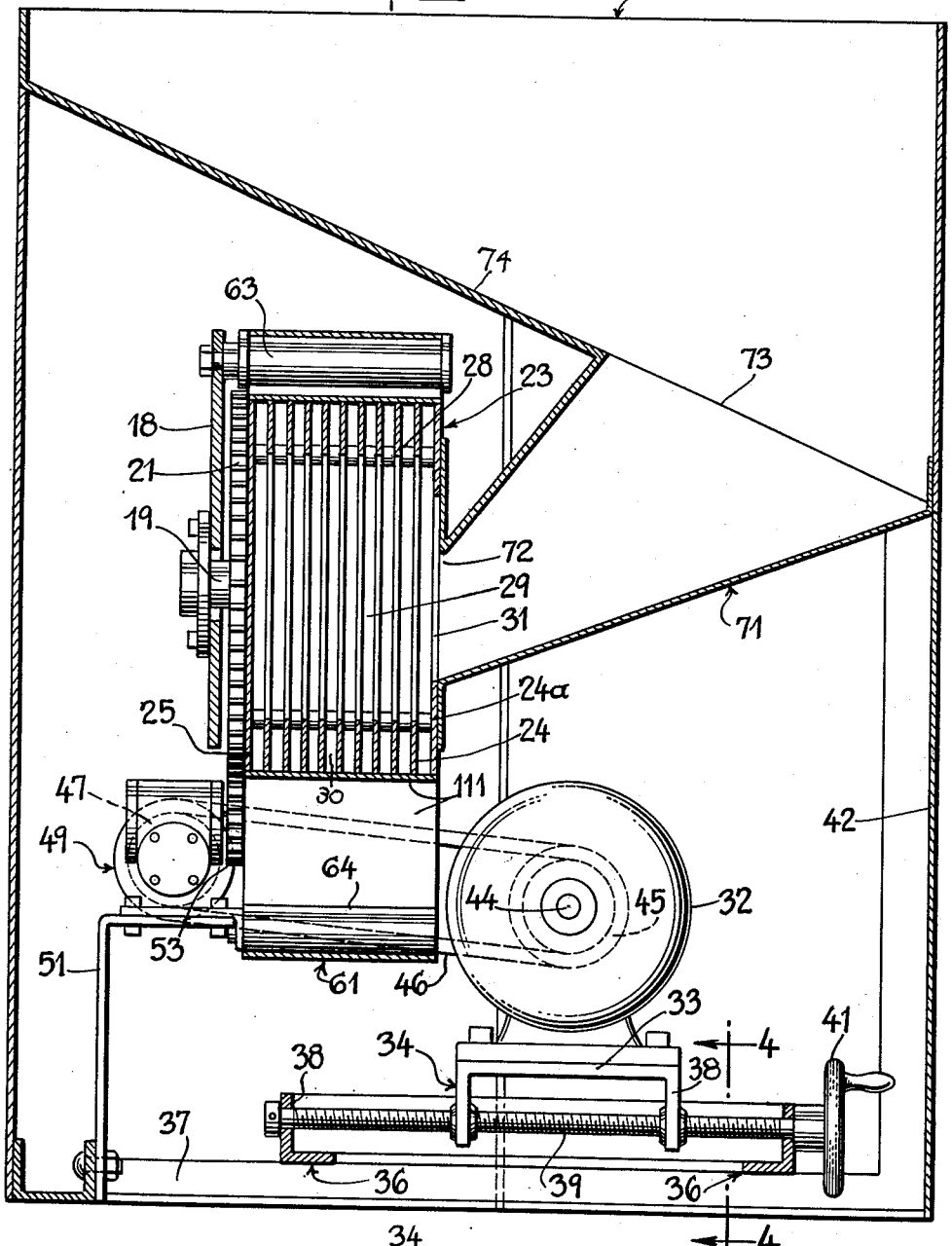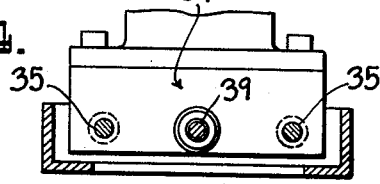

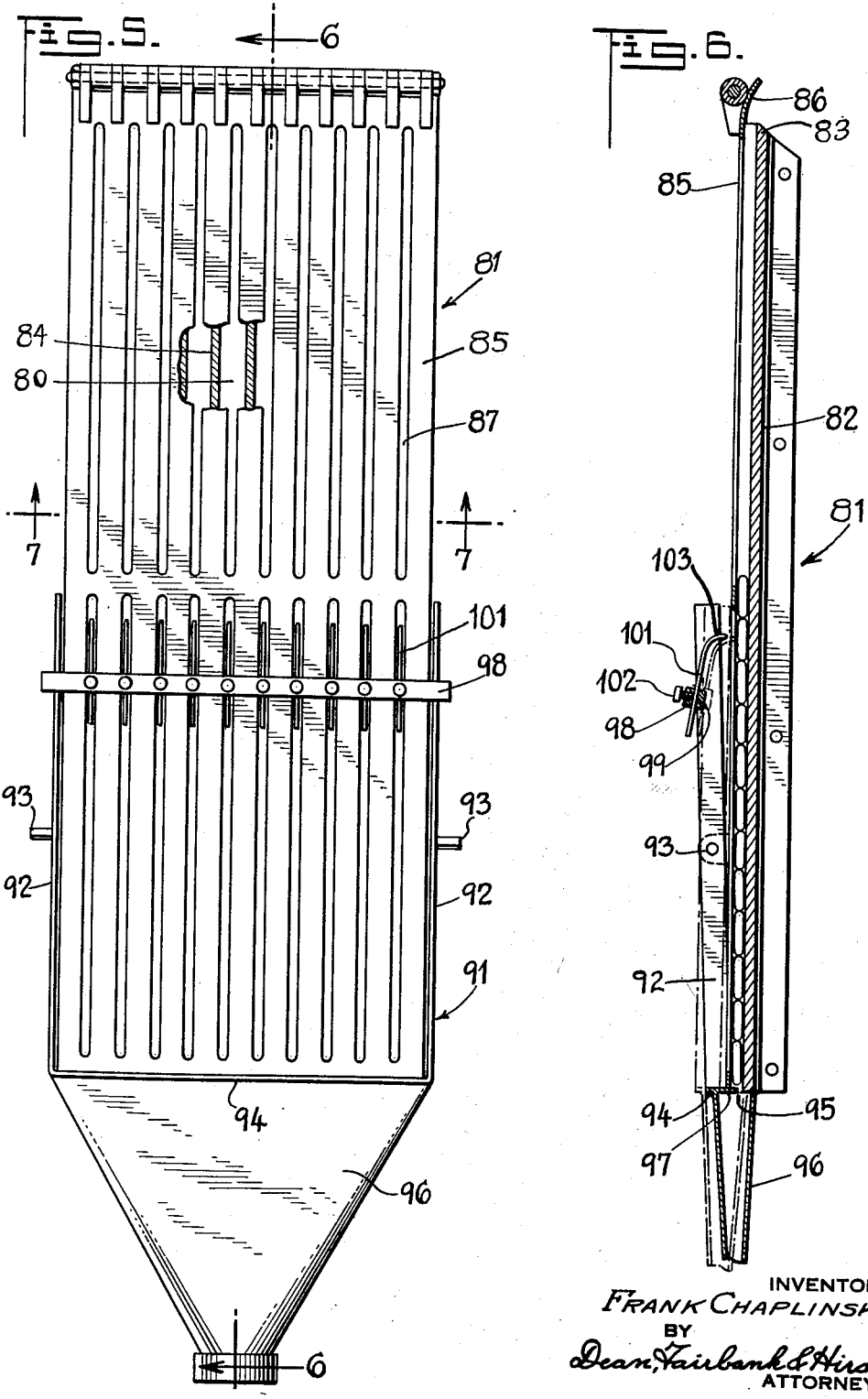

United States Patent Office
2,915,217
Patented Dec. 1, 1959

2,915,217

ARTICLE FEEDING EQUIPMENT

Frank Chaplinski, Franklin Township, Somerset County, N.J., assignor to Carroll Dunham Smith Pharmacal Company, a corporation of New Jersey Application June 4, 1957, Serial No. 663,447

10 Claims. (Cl. 221—68)

This invention relates to the art of article feeding and counting equipment and more particularly to equipment for dispensing predetermined quantities of small articles such as capsules or the like.

As conducive to an understanding of the invention, it is to be noted that where small articles are to be charged into suitable containers, such as bottles and it is essential that each bottle contain a predetermined quantity, where the bottles are filled manually, the operation is extremely time-consuming and adds greatly to the cost thereof, and where the articles are medicinal capsules for internal use, manual handling thereof may render them unsanitary.

Where the bottles are filled automatically and the articles are relatively fragile or easily subjected to breakage if rubbed or roughly handled, especially in the case of capsules having two relatively thin gelatinous shells with the open end of one of the shells nested in the open end of the other shell, and which are filled with powder or liquid, it is essential that the capsule be subjected to a minimum of abrasion or pressure which could cause puncturing of the shells or separation of one of the shells from the other with resultant escape of the contents of the capsule.

It is accordingly among the objects of the invention to provide an equipment for feeding and counting relatively small articles such as capsules or the like, which equipment is relatively simple in construction and has but few parts which are not likely to become deranged even after long operation and which will dependably feed such small articles into a counting unit without manually handling thereof and without likelihood of injury to such articles and which may readily be actuated to discharge a predetermined number of articles from the counting unit into a suitable container and which, when the counting unit is completely filled prior to discharge of articles therefrom, will deflect excess articles away from the counting unit without likelihood of injury to such articles.

According to the invention, a rotatable drum is provided having a plurality of parallel annular spaces therein and a discharge unit is associated with the drum, said discharge unit having a plurality of parallel longitudinal channels aligned respectively with the annular spaces in the drum. Means are provided to advance the articles in the annular spaces in the drum to the inlets of the channels in the discharge unit and to permit passage into each of said channels of only one article at a time from each of said spaces. Means are also provided to deflect back into the drum any articles in excess of those passing into the inlets of the channels.

The discharge unit has means to close the outlet ends of the channels and also has means when the outlet ends are open to restrain movement therethrough of articles in the channels in excess of a predetermined number so that only a predetermined number of articles will be discharged through such outlets.

In the accompanying drawings in which are shown one or more of various possible embodiments of the several features of the invention:

Fig. 1 is a perspective view of the equipment,
Fig. 2 is a sectional view taken along line 2—2 of Fig. 1,
Fig. 3 is a view similar to Fig. 2 taken along line 3—3 of Fig. 1,
Fig. 4 is a detailed sectional view taken along line 4—4 of Fig. 3,
Fig. 5 is a front elevational view of the discharge unit with parts broken away,
Fig. 6 is a sectional view taken along line 6—6 of Fig. 5, and
Fig. 7 is a transverse sectional view taken along line 7—7 of Fig. 5.

Referring now to the drawings, the equipment comprises a substantially rectangular casing 11, which has a trough shaped hopper 12 at the top thereof. Extending outwardly from the front wall 13 of the casing 11 adjacent one end thereof and straddling a rectangular opening therein are spaced walls 15 and 16, the outer edges 17 of which are inclined outwardly from the upper edge of front wall 13.

Affixed to the side of wall 15 and extending into the casing 11 is a plate 18 which mounts a stud shaft 19 (Fig. 3) on which is mounted a gear 21 positioned in the casing 11. The gear carries a drum 23 which illustratively comprises a plurality of rings 24 illustratively ten in number and a disc 25 all of the same outer diameter.

The disc 25 and the rings 24 are secured to the gear 21 so as to be coaxial therewith by means of a plurality of bolts 27 having associated spacers 28 thereon positioned between the disc and the rings. Thus, the drum has ten annular spaces 30, each of width but slightly larger than that of the capsules, said drum having a central bore 29 with its mouth 31 defined by the inner periphery of ring 24a which is of smaller diameter than the inner peripheries of the other rings 24.

The drum 23 is rotated by a drive motor 32 positioned in the casing 11 and mounted on the cross piece 33 of a U-shaped bracket 34, which is slidably mounted on a pair of spaced rods 35 affixed at their ends in brackets 36 mounted on the base 37 of the casing 11, the rods extending through suitable openings in the legs 38 of the bracket 34. Also extending through threaded openings in legs 38 is a screw 39 which has a handwheel 41 at one end accessible through a door 42 in end wall 43 of the casing 11.

The drive shaft 44 of motor 32 mounts a pulley 45 connected by belt 46 to a pulley 47 mounted on the input drive shaft 48 of a speed changer 49. As is clearly shown in Figs. 2 and 3, the speed changer is mounted on a standard 51 rising from the base 37. The output drive shaft 52 of speed changer 49 mounts a gear 53 which meshes with gear 21 to rotate the latter and the drum 23 thereon.

The gear 21 meshes with a gear 54 affixed on a shaft 50 extending laterally from plate 18 and which carries a roller 55 extending transversely across the drum 23 and positioned adjacent the latter as shown in Fig. 2, an idler roller 56 being positioned beneath and spaced from roller 55 also adjacent drum 23.

Riding around the periphery of drum 23 is an endless belt 61 which rides around rollers 55, 56, the space 62 between the portion of belt 61 between rollers 55, 56 defining the outlet of the drum.

The belt also rides over rollers 63, 64 positioned above and below the drum and a roller 65 positioned on the side of drum 23 opposed to the rollers 55, 56, all of said rollers 63, 64 and 65 extending transversely across the drum parallel to the axis thereof.

Associated with the mouth or inlet 31 of the drum 23 is an inclined funnel 71 (Fig. 3) which has its outlet 72 aligned with the mouth 31 of the drum and its inlet 73 in the inclined floor 74 of hopper 12.

Means are provided to discharge measured quantities of small identical objects such as capsules, from the drum 23. To this end a discharge unit 81 is provided which desirably comprises a substantially rectangular back plate 82 positioned between the walls 15 and 16 and inclined outwardly from the upper edge of front wall 13. The upper edge 83 (Fig. 2) of back plate 82 is slightly spaced from the roller 56 and the belt therearound. Affixed to the back plate and extending the length thereof are a plurality of spaced parallel strips 84 illustratively eleven in number defining ten separate channels 80, each of which is of height and width but slightly larger than the corresponding dimensions of a single capsule.

Extending over the strips 84 and secured thereto is a rectangular cover plate 85, the upper edge 86 of which defines a baffle strip that is curved inwardly and is positioned between the rollers 55, 56 adjacent the portion of belt 61 riding around roller 55.

The cover plate 85 has a plurality of parallel longitudinal slots 87 positioned respectively over the channels defined by the strips and of width less than that of the capsules. Positioned over the cover plate 85 adjacent the lower end thereof is a substantially U-shaped bracket 91, the legs 92 of which have outwardly extending studs 93 rotatably mounted in bearings 90 mounted on edges 17. The cross piece 94 of bracket 91 is positioned adjacent the discharge ends 95 of the channels 80 and is designed to extend transversely across said discharge ends to close the channels as shown in Fig. 5. The cross piece 94 mounts a funnel 96 having its inlet or mouth 97 aligned with all of the channels so that the capsules in the channels will be discharged into the funnel when the bracket 91 is pivoted to move the cross piece 94 away from the discharge ends 95 of the channel.

Means are provided to release a predetermined quantity of capsules from the channels 80 for discharge into the funnel 96. To this end, a bar 98 is affixed to the legs 92 of bracket 91 and extends transversely thereacross. The bar 98 has a plurality of slots 99 therethrough aligned with the slots 87 in the cover plate and a leaf spring 101 extends through each of said slots 99, being retained in position as by set screws 102. The upper end 103 of each of the leaf springs 101 is inwardly bent so that it may extend through the slot 87 to press against a capsule in the associated channel 80 when the bracket 91 is pivoted to open the discharge ends of the channels.

In the illustrative embodiment, the ends 103 of the leaf springs 101 are positioned to press against the eleventh capsule from the discharge end of the channels 80 so that ten capsules may be discharged into the funnel 96 in the manner hereinafter described.

In the operation of the equipment, the hopper 12 is charged with the capsules to be counted and such capsules will slide down the inclined floor 74 of the hopper into the funnel 71 to be fed into the mouth 31 of the drum 23. The motor 32 is then energized and through belt 46 and speed changer 49 the gear 53 will rotate gear 21 and the drum 23 in a clockwise direction from the position shown in Fig. 2. Simultaneously, the gear 21 will rotate gear 54 and roller 55 in a counterclockwise direction to revolve the belt 61.

As the drum 23 rotates, the capsules continuously fed into the mouth 31 thereof by the funnel 71 will be discharged over the entire width of the drum and fall into the annular spaces 30 filling such spaces 30 with the capsules. By reason of the run 111 of the belt on the lower circumference of the drum, none of the capsules will fall out of the drum.

With continued rotation of the drum and the run 111 of belt 61 in a clockwise direction, as the lowermost capsules in the spaces 30 are resting against the run 111 of belt 61, they will be carried up to the outlet 62 between the rollers 55 and 56.

When the capsules in the spaces 30 are carried to the outlet 62, by reason of the inturned end 86 of cover plate 85, only the lowermost capsules will pass beneath said end 86 and be carried by the portion 112 of belt 61 riding around roller 56, into the inlet of the ten channels 80 which are aligned with the respective spaces 30 in the drum 23. The other capsules brought to the outlet 62 will be deflected by the portion 113 of belt 61 riding around roller 55, back into the drum 23.

When the capsules enter the inlets of the channels 80, they will slide by gravity down the channels to the discharge ends thereof which are normally closed by the cross piece 94 of bracket 91.

With continued rotation of drum 23, the channels 80 will fill with the capsules, arranged end to end in the channels. When the channels are completely filled as no further capsules can enter the inlet ends of the channels, they will be deflected by the run 113 of belt 61 riding around roller 55 back into the drum 23.

To effect discharge of a predetermined quantity of capsules, it is merely necessary to position a bottle, for example, beneath the outlet of funnel 96 and pivot the bracket 91 in a clockwise direction from the position shown in Fig. 2. This will cause the ends 103 of springs 101 to engage the eleventh capsule from the discharge end of each of the channels and cause the cross piece 94 of the bracket 91 to move away from the discharge ends of the channels.

As a result, ten capsules in each channel will be discharged by gravity through funnel 96 into the bottle, the eleventh capsule being restrained from movement by reason of the associated spring 101.

After the bottle has been charged with capsules, the bracket 91 is pivoted in a counterclockwise direction back to the position shown in Fig. 2. By reason of the resilience of the leaf springs 101, the eleventh capsule in each channel 80 will be retained in fixed position until the cross piece 94 of bracket 91 has again closed the discharge ends of the channels. Thereupon the leaf spring will move away from the eleventh capsule and these capsules, as well as those immediately above, will slide down the channels to the closed discharge ends thereof and the channels will again be filled by reason of the rotation of drum 23 and belt 61.

With the construction above described, as soon as the channels are filled, excess capsules will be returned to the drum by the portion 113 of belt 61 until the channels have been cleared by discharge of capsules therefrom and subsequent release of the capsules by outward movement of spring 101 which permits the capsules in the channels to slide down the latter to the closed ends thereof.

As there is no direct pressure against the capsules to force them into the channels, and as the pressure of the springs 101 is relatively slight, there is no likelihood of damage thereto with attendant waste.

As the spacing between the rings of the drum may readily be adjusted by utilizing different size spacers and as the width and depth of the channels may be changed by selection of strips 84 of the desired dimensions, the equipment is readily adaptable to handle capsules of a wide range of sizes.

Although the equipment has illustratively been shown and described with respect to the feeding of capsules, it is of course to be understood that it can be used with other objects, such as pills, tubes and the like.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Article feeding equipment comprising a drum having an inlet for charging the drum with such articles, means to rotate said drum on a horizontal axis, said drum having a plurality of parallel internal annular spaces extending radially therethrough coaxial therewith, a roller positioned near the periphery of said drum extending parallel to the axis thereof, said roller having its axis lying in a plane adjacent the horizontal plane of the axis of said drum, a belt having a portion thereof positioned against the periphery of said drum under the annular spaces therein and a portion riding around said roller, a discharge unit having a plurality of parallel channels each having an inlet aligned with the annular spaces in said drum and positioned adjacent the portion of the belt riding around said roller, each of said spaces and said channels being of width slightly larger than that of the article, means to advance said belt to move the portion thereof under the annular spaces in said drum in the same direction as said drum whereby the articles in said spaces will be carried by the portion of the belt riding around said roller to the inlets of said channels, means positioned adjacent said roller to permit passage into each of said channels of only one article at a time from said drum, and means to deflect back into the drum articles in excess of those passing into said inlets.

2. The combination set forth in claim 1 in which each of said channels has a discharge end and means are provided releasably to close said discharge ends.

3. The combination set forth in claim 1 in which said discharge unit comprises a back plate forming the bottom of said channels and a cover plate forming the top of said channels, said unit being positioned with the inlets of said channels at the upper end thereof and with the discharge ends of said channels at the lower end thereof, said discharge ends normally being closed, and means to open the discharge ends of said channels to permit discharge therethrough of a predetermined number of articles from each of said channels.

4. The combination set forth in claim 1 in which said discharge unit comprises a back plate forming the bottom of said channels and a cover plate forming the top of said channels, said cover plate having a plurality of apertures therethrough aligned respectively with said channels, said unit being positioned with the inlet of said channels at the upper end thereof and with the discharge ends of said channels at the lower end thereof, a member extending transversely across the discharge ends of the channels to close the latter and movable away from said discharge ends to open the latter, a plurality of resilient members aligned respectively with the apertures in said channels and adapted to move into and out of said apertures to engage the article aligned with said resilient members in each of said channels, and means to effect movement of said resilient members into said apertures to engage the article in said channel before movement of said member away from the discharge ends of the channels to open the latter.

5. The combination set forth in claim 1 in which said discharge unit comprises a back plate forming the bottom of said channels and a cover plate forming the top of said channels, said cover plate having a plurality of apertures therethrough aligned respectively with said channels, said unit being positioned with the inlets of said channels at the upper end thereof and with the discharge ends of said channels at the lower end thereof, a U-shaped bracket associated with said discharge unit and having a cross piece extending transversely across the discharge ends of the channels to close the latter and having its legs extending longitudinally of said unit, a bar mounted on said legs and extending transversely across said cover plate, and a plurality of leaf springs mounted on said bar and aligned respectively with the apertures in said channels, said bracket being pivotally mounted on an axis extending transversely with respect to said unit, between said cross piece and said bar, whereby when said bracket is pivoted to move the cross piece away from said discharge ends of said channels to open the latter, said leaf springs will be moved into the associated aperture to engage the article aligned with said leaf spring in each of said channels, said cross piece and said resilient members being positioned for engagement of such article by said springs before movement of the cross piece away from the discharge ends of the channels to open the latter.

6. The combination set forth in claim 1 in which the means to deflect back into the drum articles in excess of those passing into said inlets comprises a second roller positioned above said first roller, extending parallel thereto adjacent said drum, the space between said rollers defining an outlet, and means to rotate said second roller in direction opposite to the direction of rotation of said first roller, and the means to permit passage of only one article at a time from said drum comprises a baffle positioned adjacent said second roller and spaced from said first roller by a distance sufficient to permit passage therebetween of only one article at a time into each of said channels, said baffle extending the width of said outlet, whereby only the articles passing beneath the baffle from the outlet will pass into said channels and the other articles from the outlet will be deflected by said second roller back into said drum.

7. The combination set forth in claim 1 in which the means to deflect back into the drum articles in excess of those passing into said inlets comprises a second roller positioned above said first roller, extending parallel thereto adjacent said drum, the space between said rollers defining an outlet, means to rotate said second roller in direction opposite to the direction of said first roller, and a third roller on the side of the drum substantially diametrically opposed to said second roller and two additional rollers positioned respectively above and below said drum, said third roller and said additional rollers extending parallel to the axis of said first two rollers, said belt having a portion riding around said third roller and said additional rollers and a portion riding around said second roller and positioned against the periphery of said drum, and the means to permit passage of only one article at a time from said drum comprises a baffle positioned adjacent said second roller and spaced from said first roller by a distance sufficient to permit passage therebetween of only one article at a time into each of said channels, said baffle extending the width of said outlet whereby only the articles passing beneath the baffle from the outlet will pass into said channels and the other articles from the outlet will be deflected by the portion of the belt riding around the second roller back into said drum.

8. The combination set forth in claim 1 in which said drum comprises a plurality of annular parallel coaxial members, and the inner periphery of the annular member at one end of the drum defines the inlet thereto.

9. The combination set forth in claim 1 in which said drum comprises a plurality of annular parallel coaxial members, the inner periphery of the annular member at one end of the drum defining the inlet thereto, and a hopper associated with said drum and positioned above the latter, said hopper having a funnel in communication with said inlet for discharge into said drum of articles from said hopper.

10. The combination set forth in claim 1 in which said drum comprises a gear, a plurality of spaced parallel annular members are secured to said gear coaxial therewith and extending laterally from one side thereof, the periphery of the annular member at one end of the drum defining the inlet thereto, and drive means operatively connected to said gear to rotate the latter.

References Cited in the file of this patent

UNITED STATES PATENTS

| | | |
|---|---|---|
| 736,622 | Olin | Aug. 18, 1903 |
| 1,095,191 | Curtis | May 5, 1914 |
| 1,457,459 | Puc | June 5, 1923 |
| 1,476,223 | Salfisberg | Dec. 4, 1923 |
| 1,531,644 | Brown | Mar. 31, 1925 |
| 2,083,534 | Magidson | June 8, 1937 |
| 2,661,133 | Clement | Dec. 1, 1953 |